March 19, 1929.  J. CLAYTON  1,705,899
TAKE-UP OR TENSIONING DEVICE
Filed June 19, 1926
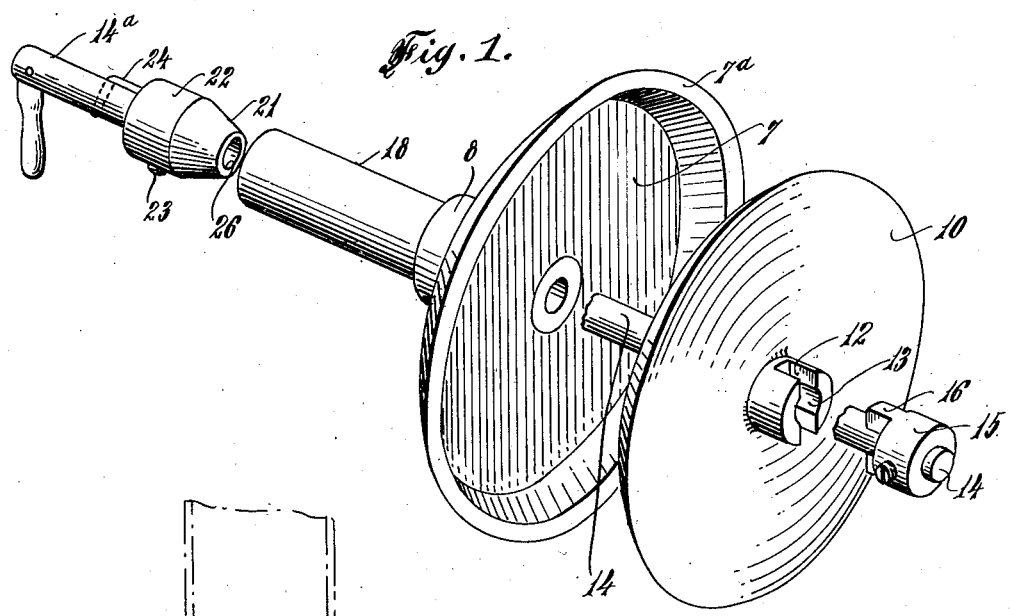
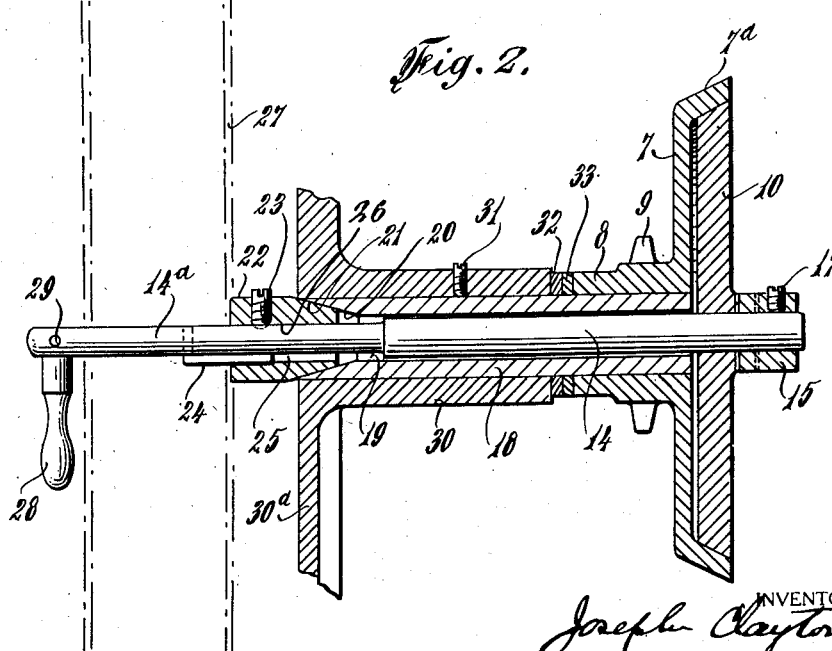
INVENTOR
Joseph Clayton
BY
P. Frank ~~~~
ATTORNEY Patented Mar. 19, 1929.

1,705,899

UNITED STATES PATENT OFFICE.

JOSEPH CLAYTON, OF NEW YORK, N. Y.

TAKE-UP OR TENSIONING DEVICE.

Application filed June 19, 1926. Serial No. 117,016.

The present invention relates generally to winding mechanisms, and is more especially directed to improvements in tensioning or take-up mechanisms for winding devices of the type shown in United States Letters Patent No. 1,398,680 granted to me November 29, 1921.

In my above identified Letters Patent, I have shown and described a take-up or compensating mechanism for use in conjunction with winding devices for various purposes which functions to maintain the material which is being wound under constant tension during the winding operation.

In showing a specific use, I elected to describe my aforesaid invention as applied to a motion picture projecting apparatus for keeping the film under tension as it passes through the machine for winding upon the usual reel.

As pointed out in my aforesaid disclosure, prior types of take-up mechanism had many disadvantages, especially those employed in motion picture projectors, which my invention was designed to overcome or eliminate in a simple and effective manner.

The present invention is generally directed to the attainment of the same objects as those which were the aim of my patented invention which has gone into extensive commercial use, superseding the former types of mechanisms in the majority of cases.

More specifically, it is the object of the present invention to provide a simplified and less costly means for attaining the objects set forth in the disclosure in my aforesaid Letters Patent, and in so doing to refine and correlate the structural elements to reduce the number of parts and generally improve the assembly of the mechanism.

It is also an object of this invention to increase the efficiency of take-up mechanisms generally and especially those having the characteristics of the invention of my aforesaid Letters Patent, my invention being applicable to a multiplicity of uses in conjunction with the winding of various materials.

As in my prior disclosure, I have elected to show and describe my present invention, more or less specifically, in connection with its application to apparatus for projecting motion pictures. However, this is merely illustrative, and I would have it understood that I reserve unto myself all rights to the full range of equivalents, both in structure and in use, to which I may be entitled under my invention in its broadest aspect. As an example of other uses it may be pointed out that my invention may be advantageously employed in conjunction with winding mechanisms in the textile art, as in winding ribbons or tape upon spools and similar supports, or cloth upon the usual bolt boards.

In the accompanying drawings, in which I have shown a preferred assemblage of elements, which it is obvious may be changed, without departing from the spirit and scope of my invention:

Figure 1 is a view in perspective of the co-operating elements of my invention in disassembled relation, the take-up shaft being broken away for clearness; and Figure 2 is a longitudinal section of the take-up device or mechanism as supported from a suitable bracket as a motion picture projector, the film reel being indicated in dash and dot lines.

Referring now to the drawings in detail, in which like characters of reference are employed to designate similar parts in the several views, 7 indicates the female of a pair of conical clutch members which embodies a hub 8 provided with teeth or projections 9 on its perimeter, whereby the device may be driven or actuated through the medium of a chain, as hereinafter described.

The aforesaid clutch member 7 may be formed of any suitable metal, the inner surface of the rim 7$^a$ thereof being preferably ground for engagement with the complemental surface of the disc-like male clutch member 10 which has a preferably integrally formed and centrally located boss 11 on its outer face, this boss being slotted as indicated at 12, the diametrically opposite portions of the slot in the wall of said boss merging into the central bore 13 which is continued through said clutch member 10.

As will be observed from Figure 2, the said clutch member 10 is adapted to be mounted upon the shaft 14 which extends therethrough and beyond the boss 11 to receive an adjustment and keying member, functioning as hereinafter described. This member preferably embodies an annular body portion 15, apertured to fit upon said shaft, with integral lugs or projections 16 disposed on each side of the shaft so as to register with and enter the straight portions of the slot in the boss 11, the said member being adapted to be locked or rendered non-rotatable with relation to said shaft by the set screw 17.

The shaft 14 is located within a sleeve 18, the bore 19 of which is bevelled or chamfered at one end, as shown at 20, to form a bearing surface complemental to the tapered or conical portion 21 of the member 22 which is adapted to be locked to said shaft by means of a set screw 23 and the key 24 seated in the cooperating slot 25 in the bore 26 in said member 22.

In the present showing, the portion of the shaft which carries the member 22 is undercut or of a reduced diameter, as at 14$^a$ in Figure 2, to fit the bore of a standard film reel or spool 27 which is slotted to receive the aforesaid key 24, means being provided at the end of the reduced portion of the shaft to hold the spool or reel against movement longitudinally thereof. Such means may be of a conventional type which embodies a short arm 28 hinged or pivoted within the slotted end of the shaft, as indicated at 29, it being evident that in the position shown in Figure 2 the said arm will function as a retainer, while, when it is aligned with the shaft, the reel or spool may be passed thereover to properly locate the same on the shaft. Of course, any suitable retaining means may be used and the work supporting end of the shaft 14 may be of the same diameter as the remaining portion within the sleeve 18, depending upon the use to which the device is to be applied and the manner in which it is to function.

In the operative assembly of my improved form of take-up or compensating mechanism, as applied to control the winding of a film in a motion picture projecting apparatus, the sleeve 18, is inserted in the boss of the machine bracket 30, the circumference of said sleeve being such as to insure a relatively snug fit. When the inner end of the sleeve is in registry with the face 30$^a$ of the bracket, the sleeve is locked against movement by means of the set screw 31. The clutch member 7 is then mounted upon the protruding portion of the sleeve 18, suitable washers or spacers 32—33, preferably of anti-friction material, having been located between the opposed faces of the bracket 30 and the hub 8 of said clutch member.

The shaft 14, carrying the clutch element 10 and the member 15 is then positioned within the sleeve 18 and the member 22 applied to the spool end of the shaft, in engagement with the key 24. The members 15 and 22 or either of them may be adjusted longitudinally of the shaft and locked in place by their respective set screws to provide for a predetermined amount of longitudinal movement of the shaft, for the purposes which will hereinafter become apparent.

The film spool or reel 27 may now be mounted upon the shaft 14 for rotation therewith and restrained from relative longitudinal movement by turning the arm 28 at an angle to the shaft. (See Figure 2.) With the clutch member 7, which is freely rotatable upon the sleeve 18, driven by means of a chain from a source of power, as the motor of the projector, it will be evident that the spool or reel 27 will be simultaneously rotated on its axis through the frictional engagement of the clutch member 7 with the clutch member 10 which is keyed to the shaft 14 by the lugs and cooperating slot of the member 15 and the boss 11.

The members 15 and 22 are adjusted to provide for a slight longitudinal movement of the shaft between the limits fixed thereby, it being evident that such movement of the shaft will be governed by the position of the member 22 with respect to the bearing surface 21 of the sleeve 18.

Therefore, at the beginning of the winding operation, with a small amount of material upon the spool, the slippage between the frictionally engaged clutch elements is such that the pull upon the material will be just sufficient to maintain the same under the proper tension and prevent wrapping or loose windings. As the convolutions build up, with a resulting increase in the weight of the material, the two clutch surfaces will be gradually urged into closer contact as the tapered portion of the member 22 moves outwardly upon its aforesaid bearing surface 21 in response to the increasing load. Of course this movement is gradual and continues through the winding operation, the slippage between the clutch elements increasing with the multiplication of the windings, in order that the speed of the spool may be reduced in proportion to the increase in the peripheral speed to maintain the film or material under the same tension which obtained in the initiation of the winding operation.

It will be apparent from the foregoing that throughout the winding operation the material being wound will be automatically maintained under a constant and uniform tension, irrespective of the number of windings upon the spool or other carrier, or the speed of the clutch element 7, which may be driven by a belt travelling on a pulley on the hub 8, in lieu of the chain heretofore mentioned, or by any other suitable means.

From the description of my invention as applied to the winding of a motion picture film, it will be manifest that it is susceptible of a wide range of utility, wherever it is desired to wind material upon a supporting element.

I claim:

1. A take-up mechanism for controlling the winding of material, comprising a fixed support having a cylindrical bore, a sleeve terminating in registry with one end of said bore and extending beyond the other end of said bore to provide a bearing surface, a cylindrical bore in said sleeve merging into a bevelled surface at the end thereof within said support, a shaft extending through said sleeve, a driven female clutch member having a tapered rim mounted for rotation on said bearing surface, a male clutch member having a tapered perimeter non-rotatably connected to said shaft and means for providing for limited longitudinal movement of said shaft within said sleeve, said means including a member rotatable with said shaft and formed with a surface corresponding to and cooperating with the bevelled portion of the bore of said sleeve, the longitudinal movement of said shaft providing for variable frictional engagement of the rim and perimeter of the female and male clutch members.

2. A device for maintaining material under tension during a winding operation, embodying a tubular member formed with an internal conical surface at one end, said member being adapted to be fixed in a suitable support, a shaft having portions of minor and major diameters rotatable within said member, the portion of minor diameter extending beyond the adjacent end of said tubular member to receive and support for rotation therewith a winding element, an annular clutch member having a projecting conical rim and embodying an integral hub mounted for rotation on said member, a second annular clutch member having a tapered edge adapted to register with the conical rim of said first-named clutch member, provided with a centrally located integral boss apertured to fit upon said shaft and transversely slotted, means for locking said tapered edge clutch member to said shaft, said means consisting of an annular member detachably connected to said shaft for rotation therewith and embodying integral lugs formed for entering the transverse slot in said boss, a support for the reduced portion of said shaft keyed thereto and provided with a conical surface in bearing contact with the conical surface of said tubular member, and means associated with the hub of said first-mentioned clutch member whereby said clutch member may be constantly driven in variable frictional engagement with the second clutch member, the rotative movement of the latter being governed by the longitudinal movement of said shaft and the relative shifting of the aforesaid conical bearing surfaces in response to increased and diminished loads on the work-supporting end of said shaft.

JOSEPH CLAYTON.